United States Patent
Strong

(10) Patent No.: US 12,361,177 B2
(45) Date of Patent: *Jul. 15, 2025

(54) SECURITY CAPSULE FOR ENABLING RESTRICTED FEATURES OF A MEMORY DEVICE

(71) Applicant: Micron Technology, Inc., Boise, ID (US)

(72) Inventor: Robert W. Strong, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,887

(22) Filed: Dec. 15, 2023

(65) Prior Publication Data

US 2024/0111910 A1   Apr. 4, 2024

Related U.S. Application Data

(63) Continuation of application No. 17/129,410, filed on Dec. 21, 2020, now Pat. No. 11,880,229.

(51) Int. Cl.
| | |
|---|---|
| *G06F 21/79* | (2013.01) |
| *G06F 12/14* | (2006.01) |
| *G06F 21/31* | (2013.01) |
| *G06F 21/64* | (2013.01) |
| *G06F 21/10* | (2013.01) |

(52) U.S. Cl.
CPC .......... *G06F 21/79* (2013.01); *G06F 12/1433* (2013.01); *G06F 21/31* (2013.01); *G06F 21/64* (2013.01); *G06F 21/107* (2023.08)

(58) Field of Classification Search
CPC ...... G06F 21/79; G06F 12/1433; G06F 21/31; G06F 21/64; G06F 2221/0751; G06F 21/78; G06F 21/74
See application file for complete search history.

(56) References Cited

U.S. PATENT DOCUMENTS

| 6,226,749 B1 * | 5/2001 | Carloganu ............ G06F 21/606 |
| | | 726/2 |
| 8,316,237 B1 * | 11/2012 | Felsher .................. H04L 63/061 |
| | | 380/282 |
| 9,900,159 B2 | 2/2018 | Strong et al. |
| (Continued) | | |

FOREIGN PATENT DOCUMENTS

CN          114647874 A       6/2022

OTHER PUBLICATIONS

"European Application Serial No. 21216527.8, Extended European Search Report mailed May 20, 2022", 8 pgs.

*Primary Examiner* — Khalid M Almaghayreh
(74) *Attorney, Agent, or Firm* — Schwegman Lundberg & Woessner, P.A.

(57) ABSTRACT

A processing device initializes a memory device in an unauthenticated state in which the memory device is unable to execute one or more restricted commands. The processing device accesses a security capsule that is digitally signed using a private key. The processing device transitions the memory device to an authenticated state based on verifying that the security capsule is validly signed. The processing device uses a public key corresponding to the private key to verify the security capsule is validly signed. While in the authenticated state, the memory device is able to execute the one or more restricted commands.

20 Claims, 7 Drawing Sheets

(56) References Cited

U.S. PATENT DOCUMENTS

| | | | |
|---|---|---|---|
| 10,142,112 B2 | 11/2018 | Strong et al. | |
| 10,523,444 B2 | 12/2019 | Strong et al. | |
| 11,144,635 B2* | 10/2021 | Sutton | H04L 9/0894 |
| 2004/0236852 A1* | 11/2004 | Birkestrand | G06F 9/5077 |
| | | | 705/51 |
| 2006/0117181 A1* | 6/2006 | Brickell | H04L 9/3271 |
| | | | 713/176 |
| 2007/0033419 A1* | 2/2007 | Kocher | G11B 20/00884 |
| | | | 713/193 |
| 2008/0301435 A1* | 12/2008 | Simon | H04L 9/3226 |
| | | | 713/155 |
| 2008/0301461 A1* | 12/2008 | Coulier | G06F 21/34 |
| | | | 713/184 |
| 2009/0083834 A1* | 3/2009 | Rubinstein | G06F 21/602 |
| | | | 726/2 |
| 2013/0159021 A1* | 6/2013 | Felsher | G16H 10/60 |
| | | | 705/3 |
| 2016/0269367 A1* | 9/2016 | Cocotis | H04L 63/126 |
| 2017/0026183 A1* | 1/2017 | Strong | H04L 9/3247 |
| 2018/0137299 A1* | 5/2018 | Porter | G06F 21/6245 |
| 2019/0095614 A1* | 3/2019 | Gerebe | G06F 21/52 |
| 2020/0042465 A1* | 2/2020 | Duval | G06F 3/0622 |
| 2020/0117393 A1* | 4/2020 | Boehm | G06F 3/0673 |
| 2020/0143040 A1* | 5/2020 | Sutton | G06F 3/067 |
| 2020/0210624 A1* | 7/2020 | Ladikov | G06F 21/56 |
| 2021/0377042 A1* | 12/2021 | Valdez | H04L 9/0637 |
| 2022/0198072 A1 | 6/2022 | Strong | |

* cited by examiner

SECURITY CAPSULE FOR ENABLING RESTRICTED FEATURES OF A MEMORY DEVICE

PRIORITY APPLICATION

This application is a continuation of U.S. application Ser. No. 17/129,410, filed Dec. 21, 2020, which is incorporated herein by reference in its entirety.

TECHNICAL FIELD

Embodiments of the disclosure relate generally to memory sub-systems and, more specifically, to a security capsule for enabling restricted features of a memory device in a memory sub-system.

BACKGROUND

A memory sub-system can include one or more memory devices that store data. The memory components can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
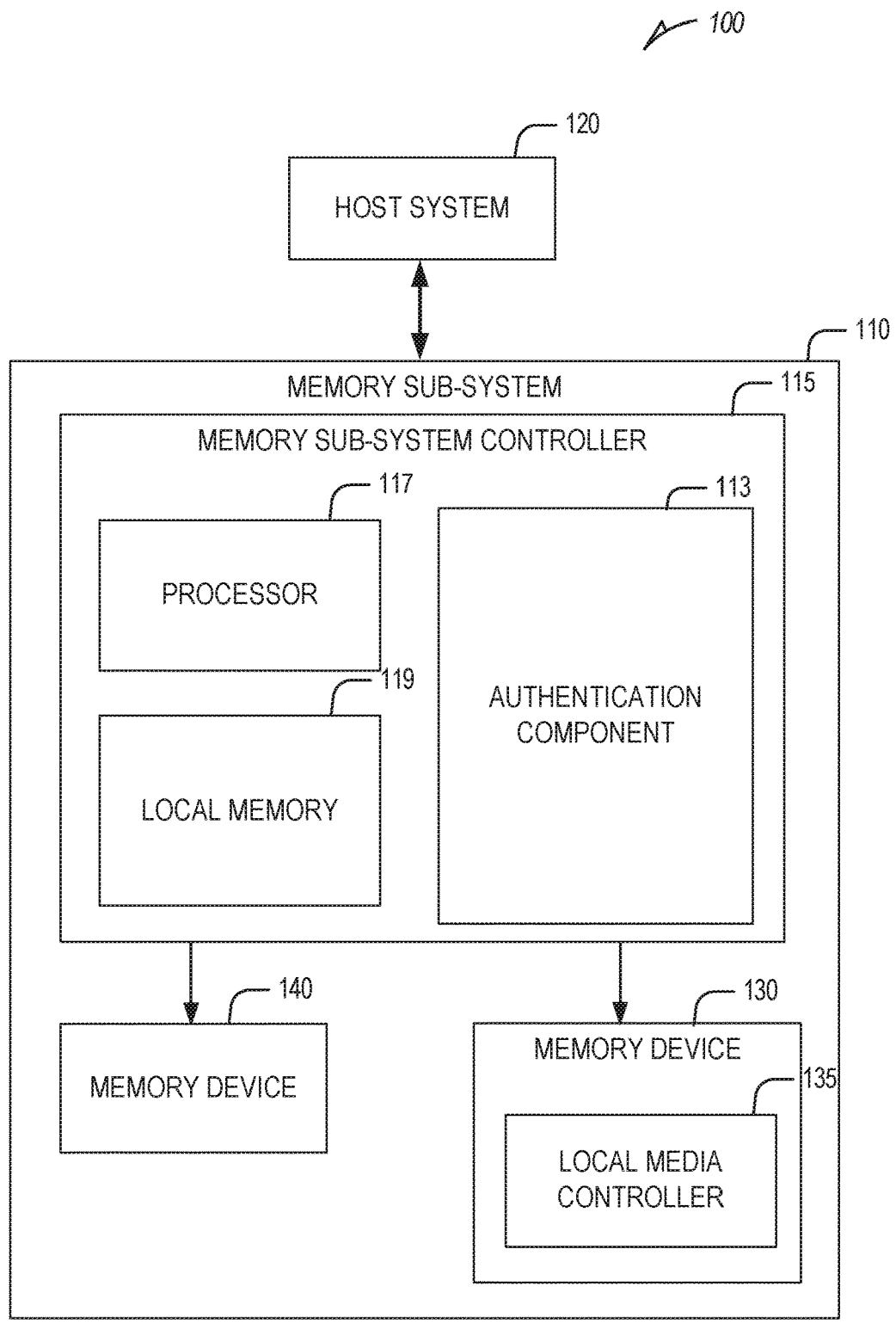
FIG. 1 illustrates an example computing environment that includes a memory sub-system, in accordance with some embodiments of the present disclosure.

Aspects of the present disclosure are directed to a security capsule for accessing restricted features of a memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a negative-and (NAND) memory device. Other examples of non-volatile memory devices are described below in conjunction with FIG. 1. Some memory devices, such as NAND memory devices, include an array of memory cells (e.g., flash cells) to store data. Each cell includes a transistor, and within each cell, data is stored as the threshold voltage of the transistor, based on the logical value of the cell (e.g., 0 or 1). Memory cells in these devices can be grouped as pages that can refer to a logical unit of the memory device used to store data. For example, memory cells in NAND memory devices are connected horizontally at their control gates to a word line to form a page. With some types of memory devices (e.g., NAND), pages are grouped to form blocks (also referred to herein as "memory blocks").

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

Many memory sub-systems support vendor-specific (VS) commands to leverage capabilities of memory devices that extend beyond the standardized commands defined by the device interface specification (e.g., SATA, NVMe, etc.). For example, most memory device vendors implement vendor-specific commands for high level debugging and secure enabling of device features (e.g., security state modification).

Typically, a memory device is initialized in an unauthenticated state where only unrestricted VS commands may be processed by the memory device. Traditional memory sub-systems employ a secure mechanism for transitioning a memory device from an unauthenticated state to an authenticated state in which restricted VS commands can be executed by the memory device. A command is considered restricted if the command can result in a change to the memory device's behavior or state or if the command can be used to extract confidential information. Traditional approaches are dependent on host system interactions that require access to a protected resource such as a Hardware Security Module (HSM) managed in a secure environment. HSMs are typically only accessible via virtual private network (VPN) connection or a direct network connection on a corporate network of the memory device manufacturer, while in some instances a portable USB-based HSM can be used. Network-based HSMs can be problematic because their use is typically restricted to authorized personnel of the memory device manufacturer. Additionally, even when authorized personnel is present at a customer site, customer security policy may restrict use of VPNs. Portable USB HSMs can also be a problem due to a limited supply as well as cryptographic import restrictions in some jurisdictions.

Aspects of the present disclosure address the above and other issues by using a security capsule to enable restricted features in a memory device of a memory sub-system. That is, a security capsule is used to transition a memory device from an unauthenticated state, in which restricted commands used to invoke the restricted features cannot be executed, to an authenticated state in which the restricted commands can be executed. A security capsule is delivered to a memory sub-system using in-band mechanisms (e.g., firmware download). The security capsule is digitally signed and verified using a dedicated private/public key pair. The memory sub-system can transition the memory device from the unauthenticated state to the authenticated state based on verifying that the security capsule is validly signed.

Each security capsule includes an anti-replay mechanism to prevent reuse. That is, once a security capsule has been successfully downloaded to a memory device it can never be used again. Security capsules can be limited to use with a single memory device or can be made generally applicable to any memory device. Beneficially, once a security capsule is built, it can be stored on portable media (e.g., USB sticks) or can be electronically transmitted to a customer site.

Use of security capsules eliminates the challenges associated with network and USB-based HSMs. Further, security capsules allow specific or all VS commands to be securely enabled. Security capsules also reduce the turnaround time associated with current approaches. For example, security capsules can be pre-built and provided to a customer on demand or at the time a storage device is delivered to a customer. Additionally, security capsules can be used to securely restrict use of certain commands or only allow a certain subset of commands to be invoked.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include multiple host systems that are coupled to one or more memory sub-systems 110. In some embodiments, the host system 120 is coupled to different types of memory sub-system 110. FIG. 1 illustrates an example host system 120 that is coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

Each host system 120 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, serial advanced technology attachment (SATA) controller). The host system 120 may use the memory sub-system 110, for example, to write data to the memory sub-system 110 and read data from the memory sub-system 110.

The host system 120 can be coupled to the memory sub-system 110 via a host interface. Examples of a host interface include, but are not limited to, a SATA interface, a PCIe interface, USB interface, Fibre Channel, Serial Attached SCSI (SAS), Small Computer System Interface (SCSI), a double data rate (DDR) memory bus, a DIMM interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. Either of the host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 130 can be grouped as pages that can refer to a logical unit of the memory device used to store data. For example, memory cells in NAND memory devices are connected horizontally at their control gates to a word line to form a page. With some types of memory (e.g., NAND), pages can be grouped to form blocks. Additionally, word lines within a memory device can be organized into multiple word line groups, each of which includes one or more word lines, though each word line group includes fewer word lines than are included in a block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application-specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controller 135 that operates in conjunction with memory sub-system controller 115 to execute operations on one or more memory cells of the memory devices 130.

The memory sub-system 110 also includes an authentication component 113 that is responsible for authenticating security capsules received from the host system 120. Each security capsule is digitally signed, and the authentication component 113 authenticates a security capsule by verifying the security capsule is validly signed, for example. A security capsule is used to enable restricted features of the memory devices 130 and 140. For example, the memory devices 130 and 140 are initialized in an unauthenticated state in which restricted VS commands used to invoke the restricted features cannot be executed by the memory devices 130 and 140. The host system 120 can provide a security capsule to the authentication component 113 to access the restricted features of one of the memory devices 130 or 140, and once the authentication component 113 verifies the security capsule is valid, the authentication component 113 transitions the memory device 130 or 140 to an authenticated state in which the commands used to invoke the restricted features can be executed. Further details with regards to the operations of the authentication component 113 are described below.

In some embodiments, the memory sub-system controller 115 includes at least a portion of the authentication component 113. For example, the memory sub-system controller 115 can include a processor 117 (processing device) configured to execute instructions stored in local memory 119 for performing the operations described herein. In some embodiments, at least a portion of the authentication component 113 is part of the host system 120, an application, or an operating system.

Figure 2:
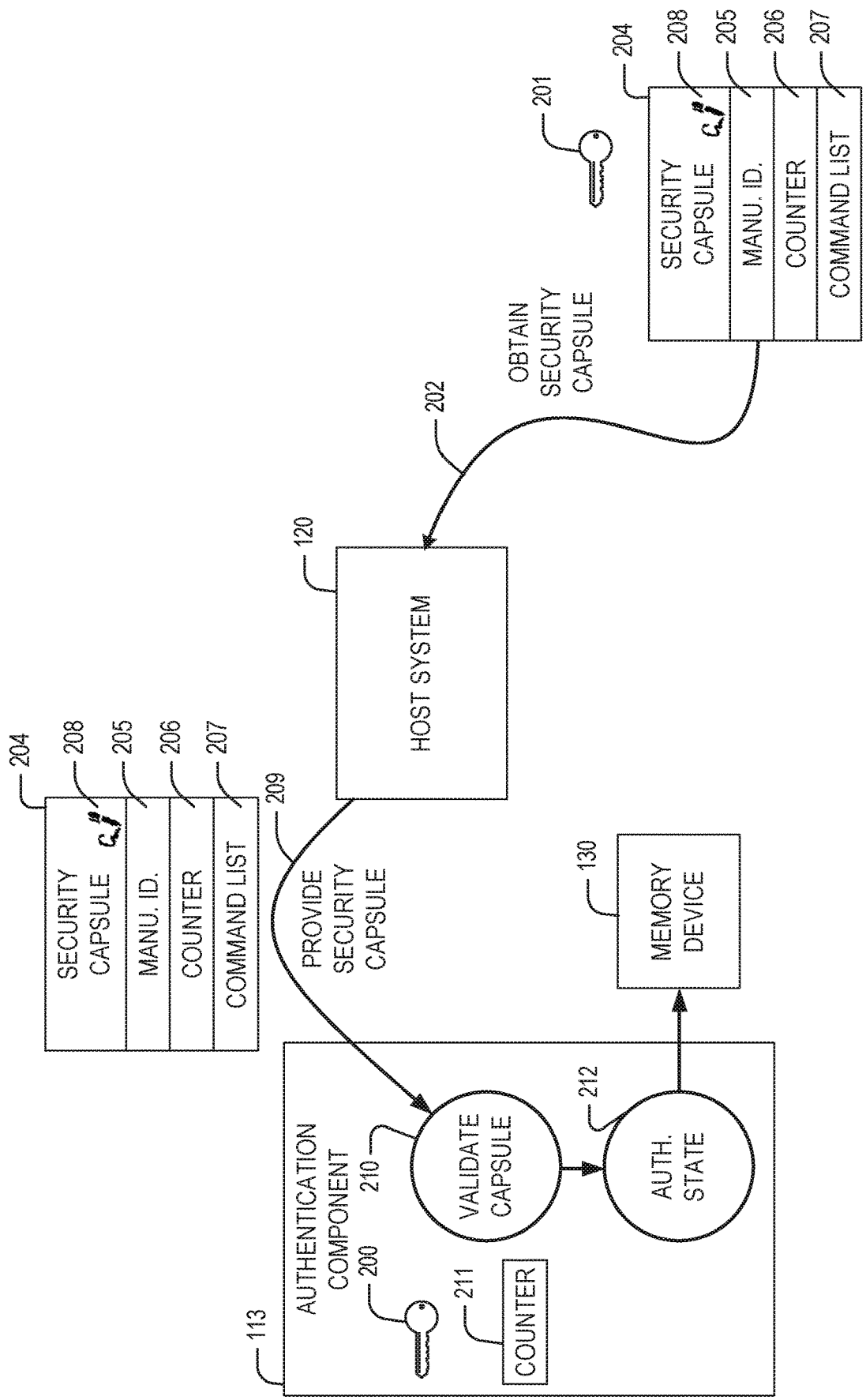
FIG. 2 is a data flow diagram illustrating interactions between components in the example computing environment in using a security capsule to enable restricted features of a memory device, in accordance with some embodiments of the present disclosure.

FIG. 2 is a data flow diagram illustrating interactions between components in a secure communication environment in performing an example method for using a security capsule to enable restricted features of a memory device, in accordance with some embodiments of the present disclosure. In the context of FIG. 2, a public/private key pair—a public key 200 and a private key 201—may be pre-generated, and the authentication component 113 may be provisioned with the public key 200 during manufacturing or in field. The authentication component 113 stores the public key 200 in a storage component (e.g., a ROM component, an OTP circuit, an e-fuse, or other dedicated hardware component). The private key 201 is secured in an HSM of a security computing environment. Data can be digitally signed using the private key 201 and the corresponding public key 200 can be used to verify the digital signature.

At 202, the host system 120 obtains a security capsule 204. For example, the security capsule 204 can be electronically transmitted to the host system 120 (e.g., via email). In another example, the host system 120 can obtain a portable storage device such as a USB flash drive on which the security capsule 204 is stored.

The security capsule 204 is a data structure (e.g., a vendor defined data structure) that includes a manufacture identifier (MID) field 205, a counter value 206, and in some embodiments, a command list 207. The MID field 205 is used to associate the security capsule 204 with a specific memory device. If a zero value is used, the security capsule 204 can be used with any memory device. If an actual MID (a non-zero value) is included in the MID field 205, the security capsule 204 can be used only with a memory device that has the specified MID. The counter value 206 is used to support anti-replay functionality. That is, the counter value 206 is used to ensure that the security capsule 204 can only be used a limited number of instances (e.g., once). The command list 207 specifies one or more permitted or prohibited commands. In some embodiments, the command list 207 may specify one or more restricted commands that can be accessed upon successful capsule verification. For example, a memory device may support 100 restricted commands, but the command list 207 in the security capsule 204 may only specify that 5 of the 100 restricted commands are to be enabled upon successful capsule verification.

The security capsule 204 is digitally signed using the private key 201. That is, the security capsule 204, as shown in FIG. 2, includes digital signature 208.

In the context of the example process illustrated in FIG. 2, the memory device 130 is initialized in an unauthenticated state. While in the unauthenticated state, certain restricted commands (e.g., restricted VS commands) cannot be issued to or executed by the memory device 130. These restricted commands, which are used to invoke restricted features of the memory device 130, can only be issued and executed by the memory device 130 while in an authenticated state. To transition the memory device 130 to the authenticated state, the host system 120 provides, at 209, the security capsule 204 to the memory sub-system 110 where it is processed by the authentication component 113. The memory device 130 is placed in an authenticating state in response to receiving an authentication initiation command (not shown) from the host system 120. While in the authenticating state, the authentication component 113 receives and validates the security capsule 204, at 210. In part, the validation of the security capsule 204 includes verifying that the security capsule 204 is validly signed. To verify that the security capsule 204 is validly signed, the authentication component 113 performs a verification of the digital signature 208 using the public key 200. If the verification fails (e.g., if the security capsule 204 was signed using a revoked key or if the security capsule 204 was signed with an invalid key), the authentication component 113 discards the security capsule 204 and returns the memory device 130 to the unauthenticated state. Additionally, the authentication component 113 maintains a retry counter, and if the verification fails, the authentication component 113 increments the retry counter. The retry counter is compared to a maximum retry count, and when the retry counter reaches the maximum retry count, the authentication component 113 ignores further attempts by the host system 120 to download a security capsule. That is, the authentication component 113 returns an error to the host system 120. The retry counter is reset if a power cycle occurs, or a security capsule is successfully validated, and the maximum retry count has not been reached. In this way, the retry counter can provide protection against brute force attacks.

The validation of the security capsule 204 further includes verifying that a value in the MID field 205 corresponds to the memory device 130 and verifying the counter value 206 is equal to or greater than a counter 211 maintained by the authentication component 113. If either verification fails, the authentication component 113 discards the security capsule 204 and returns the memory device 130 to the unauthenticated state.

In response to a successful validation of the security capsule 204, the authentication component 113 transitions the memory device 130 to an authenticated state, at 212. While in the authenticated state, the memory device 130 can accept and execute the restricted commands that were not able to be executed while in the unauthenticated and authenticating states (e.g., restricted VS commands). Based on successful validation of the security capsule 204, the authentication component 113 updates the counter 211 based on the counter value 206 and increments the counter 211.

The memory device 130 remains in the authenticated state until a power cycle event occurs or until an authentication termination command to revert the memory device 130 to the unauthenticated state is received from the host system 120. The memory sub-system 110 reverts the memory device 130 to the unauthenticated state in response to a power cycle event or in response to receiving an authentication termination command. Further details regarding the various security states of the memory device 130 are discussed below in reference to FIG. 4, according to some embodiments.

Figure 3:
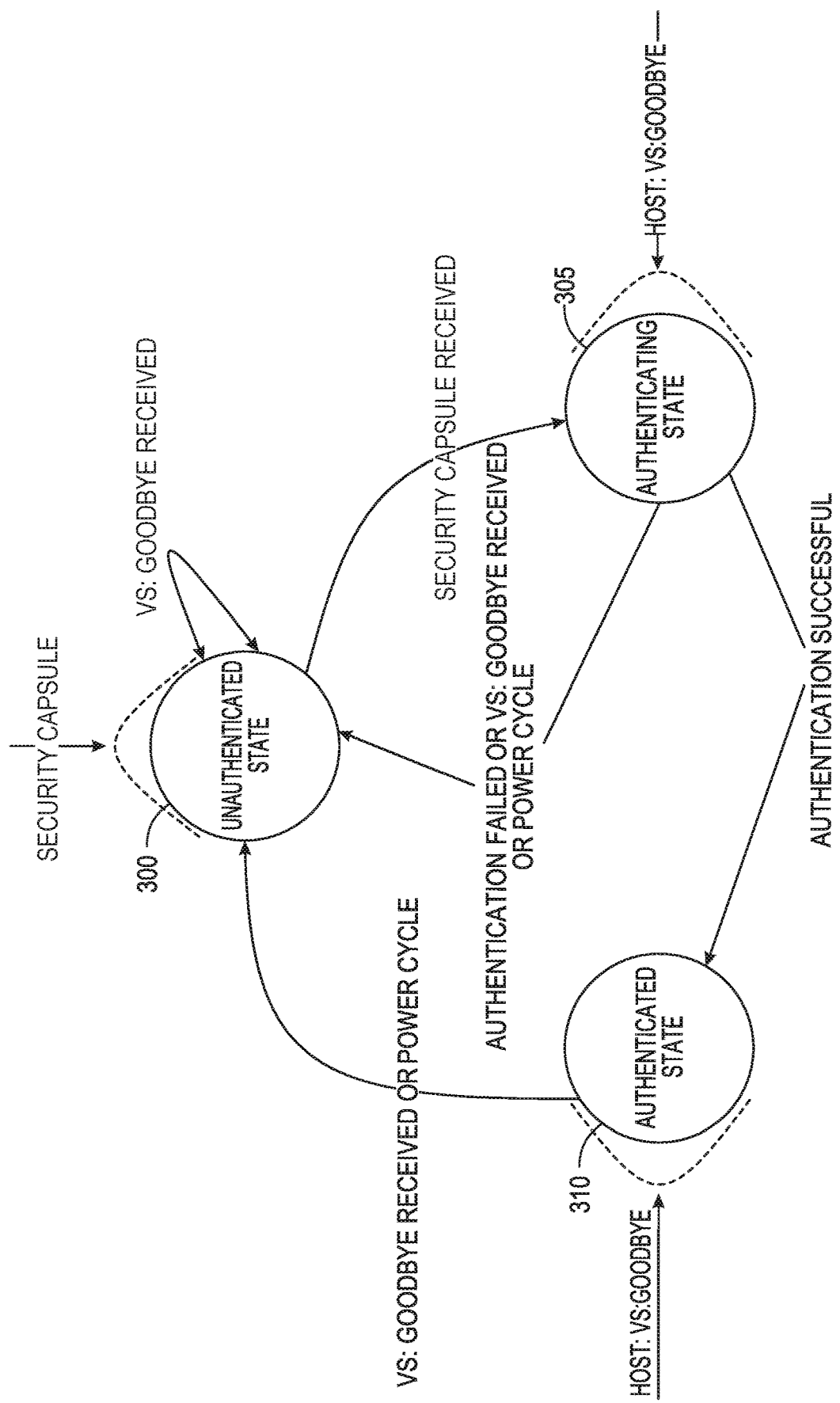
FIG. 3 is a state diagram illustrating behavior of a memory device, according to example embodiments.

FIG. 3 is a state diagram illustrating behavior of a memory device (e.g., the memory device 130 or 140), according to example embodiments. As shown, the memory device is initialized in an unauthenticated state 300. While in the unauthenticated state 300, the memory device is unable to execute certain restricted commands from the host system 120 (e.g., restricted VS commands). If an authentication termination command ("VS: Goodbye") is received from the host system 120, the memory device remains in the unauthenticated state 300.

The memory device remains in the unauthenticated state 300 until an a security capsule (e.g., security capsule 204) is received from the host system 120. Receipt of the security capsule causes the memory device to transition to an authenticating state 305. The host system 120 can provide the security capsule to the memory device using a command. While in the authenticating state 305, the authentication component 113 performs an authentication of the security capsule that includes verifying the security capsule is validly signed, as noted above. If authentication is unsuccessful, a power cycle occurs, or an authentication termination command ("VS: Goodbye") is received from the host system 120, the memory device returns to the unauthenticated state 300.

If authentication is successful, the memory device transitions to the authenticated state 310. While in the authenticated state 310, the memory device is able to accept and execute the restricted commands from the host system 120. The memory device remains in the authenticated state 310 until a power cycle occurs or until an authentication termination command is received from the host system 120.

Figure 4:
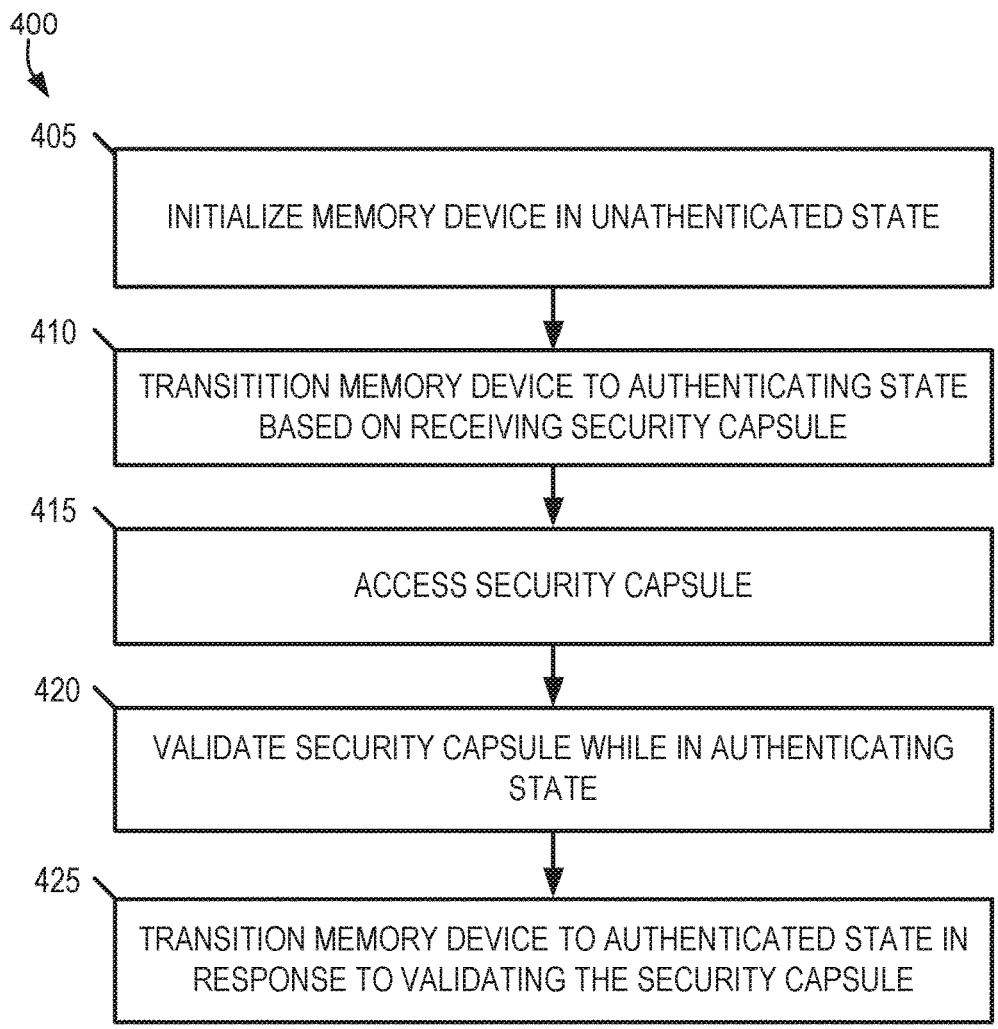
FIGS. 4-6 are flow diagrams illustrating an example method for using a security capsule to enable restricted features of a memory device, in accordance with some embodiments of the present disclosure.
Figure 5:
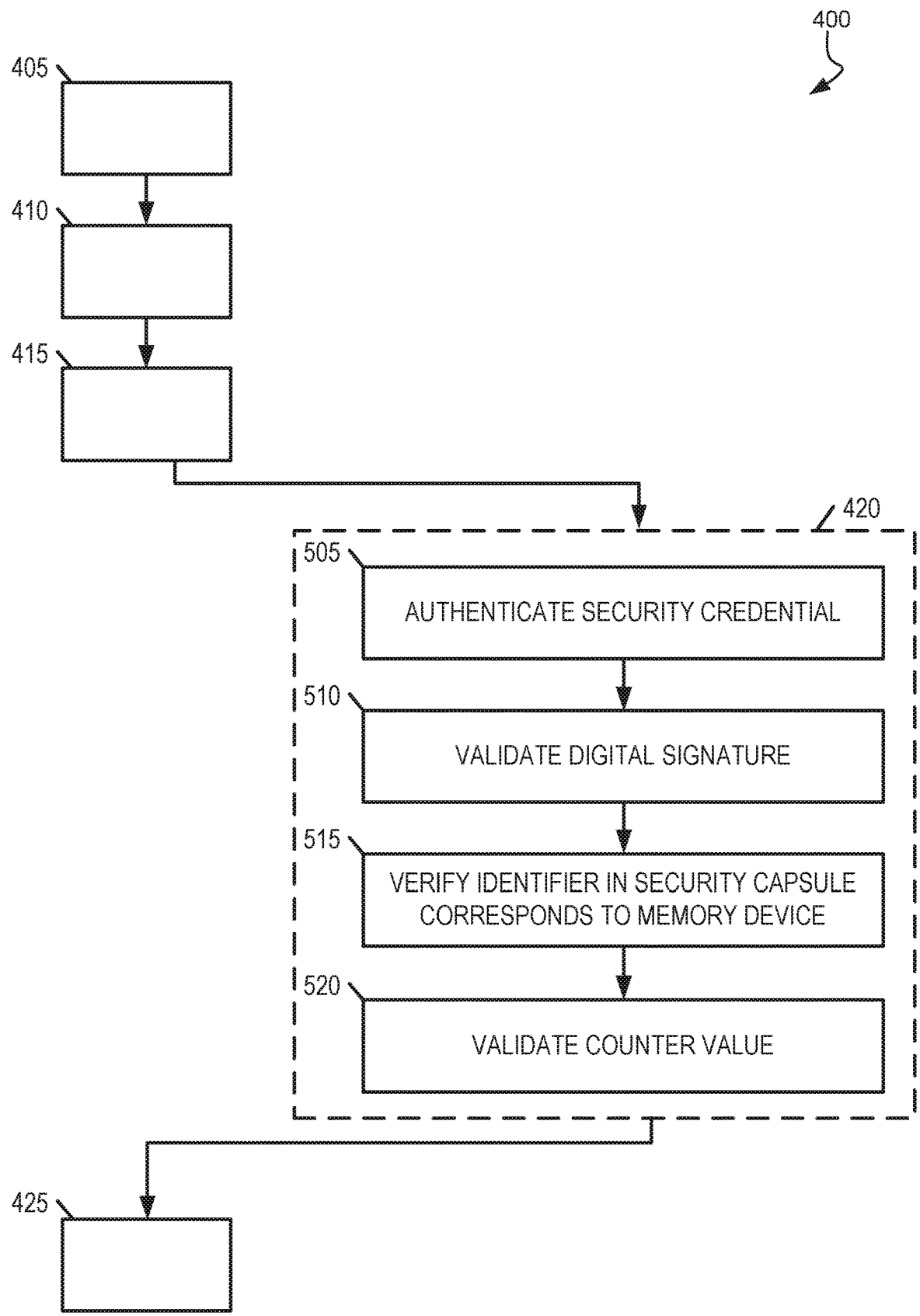
Figure 6:
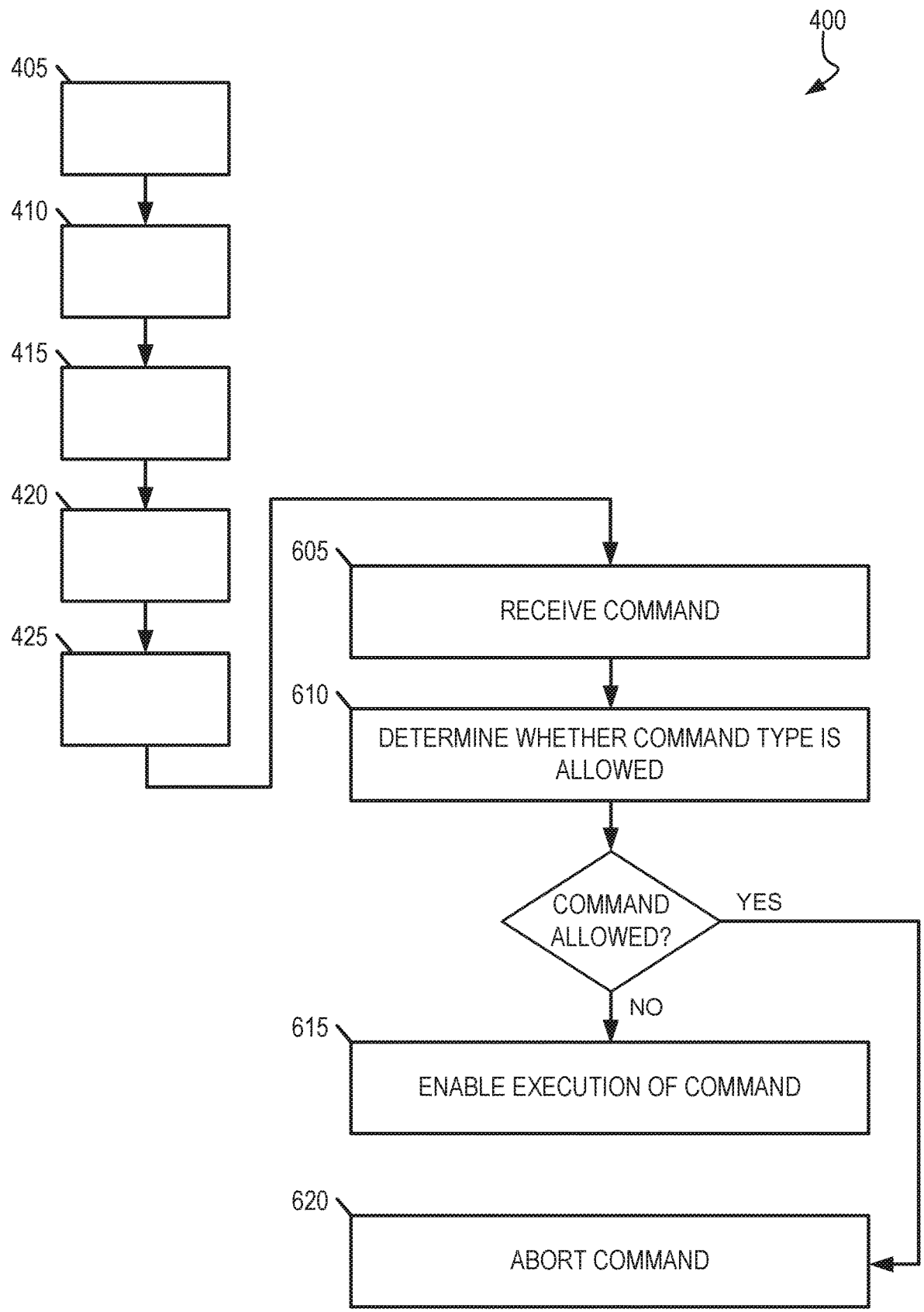

FIGS. 4-6 are flow diagrams illustrating an example method 400 for replacing a verification key using a security capsule in a memory sub-system, in accordance with some embodiments of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the authentication component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device initializes a memory device (e.g., the memory device 130) in an unauthenticated state. While in the unauthenticated state, the memory device is unable to execute at least certain restricted commands. For example, while in the unauthenticated state, the memory device is unable to execute restricted VS commands to invoke certain restricted functionality. In some instances, these commands correspond to vendor-specific commands That is, in some embodiments, the memory device is unable to execute vendor-specific commands.

The processing device transitions the memory device to an authenticating state in response to receiving a security capsule (operation 410). The security capsule can be provided with a command received from a host system (e.g., the host system 120).

At operation 415, the processing device accesses a security capsule that is digitally signed using a private key. The private key corresponds to a public/private key pair, and the public key of the pair may be maintained by the processing device. The security capsule can be digitally signed at a secure environment using a digital signature algorithm (e.g., RSASSA, Elliptic Curve Digital Signature Algorithm (EC-DSA), or the like).

The security capsule can be received from the host system. In some embodiments, receiving the security capsule includes receiving one or more commands from the host system via a host system interface. For example, the security capsule can be provided by the host system as part of the authentication initiation command or as part of a subsequent command.

The processing device validates the security capsule, at operation 420, while in the authenticating state. As part of validating the security capsule, the processing device uses the public key to verify that the security capsule is validly signed. In other words, the processing device determines whether the digital signature of the security capsule is valid using the public key. The processing device verifies the digital signature in accordance with the digital signature algorithm used to create the digital signature (e.g., RSASSA, EC-DSA, or the like). If the security capsule is invalid (e.g., because the digital signature is invalid), the processing device may discard the security capsule, create an entry in an error log, and return an error to the host system. Additionally, the processing device can maintain a retry counter to protect against brute force attacks. For example, if the security capsule is invalid, the processing device increments the retry counter. The processing device compares the retry counter to a maximum retry count, and once the retry counter reaches the maximum retry count, the processing device ignores further attempts to download a security capsule. The retry counter is reset if a power cycle occurs, or a security capsule is successfully validated, and the maximum retry count has not been reached.

In some embodiments, the validating of the security capsule includes authenticating a security credential (e.g., a password or pin) provided with the security capsule. For example, the security credential can be provided by the host system in the authentication initiation command or a subsequent command in which the security capsule is provided. The security credential can be subject to a retry maximum. For example, the processing device can utilize a retry count mechanism for the security credential that provides resistance against brute force and guessing attacks.

At operation 425, the processing device transitions the memory device to authenticated state in response to validating the security capsule. While in the authenticated state, the memory device is able to execute the restricted commands that were not able to be executed while in the unauthenticated and authenticating states. The memory device remains in the authenticated state until the memory device undergoes a power cycle or until a command is issued to the memory device to transition back to the unauthenticated state.

As shown in FIG. 5, the method 400 may, in some embodiments, include operations 505, 510, 515, 520. Consistent with these embodiments, the operations 505, 510, 515, and 520 can be performed as part of operation 420 where the processing device validates the security capsule.

At operation 505, the processing device authenticates a security credential associated with the security capsule. For example, a password or pin can be established as an initial authentication mechanism for the security capsule, and a password or pin can be provided in conjunction with the security capsule (e.g., as part of an authentication initiation command).

As noted above, the security capsule includes a digital signature (e.g., digital signature 208 along with a MID (e.g., MID 205) and a counter value (e.g., counter value 206). At operation 510, the processing device validates the digital signature. The processing device validates the digital signature using a public key that corresponds to a public/private key pair. If the validation fails (e.g., if the security capsule was signed using a revoked key or if the security capsule was signed with an invalid key), the processing device discards the security capsule and returns the memory device to the unauthenticated state.

At operation 515, the processing device verifies that the MID corresponds to the memory device. That is, the processing device verifies that the MID included in the security capsule matches a MID of the memory device. In some instances, the MID in the security capsule can be a value used to indicate that the security capsule can be used with any memory device (e.g., all 0's). In these instances, the processing device successfully verifies the MID of the security capsule regardless of the MID of the memory device.

At operation 520, the processing device validates the counter in the security capsule. To validate the counter included in the security capsule, the processing device verifies that the counter included in the security capsule is equal to or greater than a counter maintained by the processing device. If either the MID or counter verification fails, the processing device discards the security capsule 204 and returns the memory device 130 to the unauthenticated state.

As shown in FIG. 6, the method 400 may, in some embodiments, include operations 605, 610, 615, and 620. Consistent with these embodiments, the operations 605, 610, 615, and 620 can be performed as part of operation 420 where the processing device validates the security capsule.

At operation 605, the processing device receives a command. The command can be received from or based on a command from the host system. The processing device determines whether the command is a permitted command type, at operation 610. The processing device determines whether the command is a permitted command type based on a command list (e.g., command list 207) included with the security capsule. Depending on the embodiment, the command list can specify prohibit command types or permitted command types. The processing device can determine whether the command is a permitted command type based on the command type of the command being included in a list of permitted command types or not being included in a list of prohibited command types.

If the processing device determines the command corresponds to a permitted command type, the processing device enables execution of the command, at operation 615. That is, depending on the embodiment, the processing device may execute the command or cause another component such as a local media controller to execute the command by providing an appropriate command or instruction to that component.

If the processing device determines that the command is a prohibited command type, the processing device aborts the command at operation 620. The processing device can further provide an indication to the host system that the command is prohibited and/or that the command has been aborted.

In view of the disclosure above, various examples are set forth below. It should be noted that one or more features of an example, taken in isolation or combination, should be considered within the disclosure of this application.

Example 1 is a system comprising: a memory device; and a processing device coupled to the memory device, the processing device configured to perform operations comprising: initializing the memory device in an unauthenticated state in which the memory device is unable to execute one or more restricted commands; accessing a security capsule that is digitally signed using a private key; and transitioning the memory device to an authenticated state based on verifying, using a public key corresponding to the private key, that the security capsule is validly signed, the memory device being able to execute the one or more restricted commands while in the authenticated state.

Example 2 includes the system of Example 1, wherein the operations further comprise: validating the security capsule prior to transitioning the memory device to the authenticated state, the validating of the security capsule including verifying the security capsule is validly signed.

Example 3 includes the system of any one or more of Examples 1 or 2, wherein: the security capsule comprises a manufacturing identifier; and the validating of the security capsule further comprises verifying the manufacturing identifier corresponds to the memory device.

Example 4 includes the system of any one or more of Examples 1-3, wherein: the security capsule comprises a first counter value; the memory device maintains a second counter value; and the validating of the security capsule further comprises determining the second counter value is greater than or equal to the first counter value prior to transitioning to the authenticated state.

Example 5 includes the system of any one or more of Examples 1-4, wherein operations further comprise: updating the second counter value based on the first counter value.

Example 6 includes the system of any one or more of Examples 1-5, wherein the validating of the security capsule further comprises authenticating a security credential provided in conjunction with the security capsule.

Example 7 includes the system of any one or more of Examples 1-6, wherein: the security capsule specifies a list of command types; and the operations further comprise: receiving a command while the memory device is in the authenticated state; and determining whether the command is a prohibited command type based on the list of command types.

Example 8 includes the system of any one or more of Examples 1-7, wherein the operations further comprise: aborting the command based on determining the command is a prohibited command type.

Example 9 includes the system of any one or more of Examples 1-8, wherein the operations further comprise: reverting the memory device to the unauthenticated state in response to a power cycle event.

Example 10 includes the system of any one or more of Examples 1-9, wherein the operations further comprise: reverting the memory device to the unauthenticated state in response to an authentication termination command.

Example 11 is a method comprising: initializing a memory device in an unauthenticated state in which the memory device is unable to execute one or more restricted commands; accessing a security capsule that is digitally signed using a private key; and verifying, using a public key corresponding to the private key, that the security capsule is validly signed; transitioning the memory device to an authenticated state based on verifying that the security capsule is validly signed, the memory device being able to execute the one or more restricted commands while in the authenticated state.

Example 12 includes the method of Example 11 and further comprises: validating the security capsule prior to transitioning the memory device to the authenticated state, the validating of the security capsule including verifying the security capsule is validly signed.

Example 13 includes the method of any one or more of Examples 11 or 12, wherein: the security capsule comprises a manufacturing identifier; and the validating of the security capsule further comprises verifying the manufacturing identifier corresponds to the memory device.

Example 14 includes the method of any one or more of Examples 11-13, wherein: the security capsule comprises a first counter value; the memory device maintains a second counter value; and the validating of the security capsule further comprises determining the second counter value is less than or equal to the first counter value prior to transitioning to the authenticated state.

Example 15 includes the method of any one or more of Examples 11-14 and further comprises: updating the second counter value based on the first counter value.

Example 16 includes the method of any one or more of Examples 11-15, wherein the validating of the security capsule further comprises authenticating a security credential provided in conjunction with the security capsule.

Example 17 includes the method of any one or more of Examples 11-16, wherein: the security capsule specifies a list of command types; and the method further comprises: receiving a command while the memory device is in the authenticated state; and determining whether the command is a prohibited command type based on the list of command types.

Example 18 includes the method of any one or more of Examples 11-17, further comprising: aborting the command based on determining the command is a prohibited command type.

Example 19 includes the method of any one or more of Examples 11-18, and further comprises: reverting the memory device to the unauthenticated state in response to a power cycle event or an authentication termination command.

Example 20 is a computer-readable storage medium comprising instructions that, when executed by a processing device, configure the processing device to perform operations comprising: initializing a memory device in an unauthenticated state in which the memory device is unable to execute one or more restricted commands; accessing a security capsule that is digitally signed using a private key; and validating the security capsule, the validating of the security capsule comprising verifying, using a public key corresponding to the private key, that the security capsule is validly signed; transitioning the memory device to an authenticated state based on validating the security capsule, the memory device being able to execute the one or more restricted commands while in the authenticated state.

Figure 7:
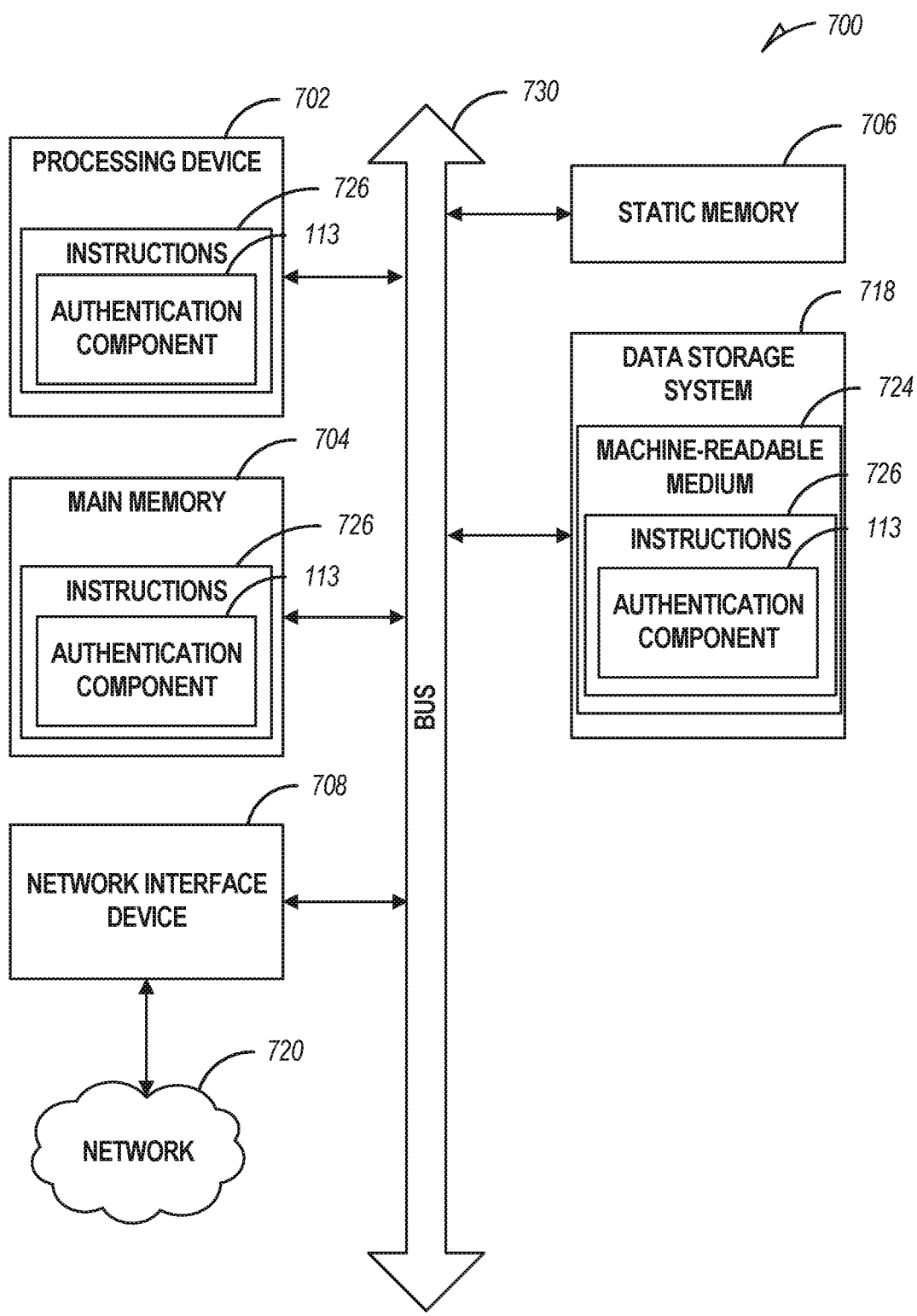
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. FIG. 7 illustrates an example machine of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the authentication component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM, flash memory, DRAM such as SDRAM or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an ASIC, a FPGA, a digital signal processor (DSP), network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a security component (e.g., the authentication component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device coupled to the memory device, the processing device configured to perform operations comprising:
   initializing the memory device in an unauthenticated state in which the memory device is unable to execute one or more restricted commands;
   accessing a security capsule that is digitally signed using a private key, the security capsule specifying a manufacturer identifier;
   validating the security capsule, the validating of the security capsule comprising verifying the manufacturing identifier specified by the security capsule matches a manufacturer identifier of the memory device;
   transitioning the memory device to an authenticated state based on validating the security capsule and verifying, using a public key corresponding to the private key, that the security capsule is validly signed, the memory device being able to execute the one or more restricted commands while in the authenticated state based on a set of command types the security capsule indicates that the memory device is able to execute while in the authenticated state; and
   in response to a power cycle event or an authentication termination command, reverting the memory device to the unauthenticated state in which the memory device is unable to execute the one or more restricted commands.

2. The system of claim 1, wherein the validating of the security capsule further comprises authenticating a security credential provided in conjunction with the security capsule.

3. The system of claim 1, wherein the security capsule comprises a data structure that includes at least one of: a counter value, and a list of commands.

4. The system of claim 3, wherein:
   the counter value is a first counter value;
   the memory device maintains a second counter value; and
   the validating of the security capsule further comprises determining the second counter value is less than or equal to the first counter value prior to transitioning to the authenticated state.

5. The system of claim 4, wherein operations further comprise:
   updating the second counter value based on the first counter value.

6. The system of claim 1, wherein the operations further comprise:
   receiving an unrestricted command while the memory device is in the unauthenticated state; and
   executing the unrestricted command while the memory device is in the unauthenticated state.

7. The system of claim 1, wherein:
   the security capsule specifies a list of command types; and
   the operations further comprise:
   receiving a command while the memory device is in the authenticated state; and
   determining whether the command is a prohibited command type based on the list of command types.

8. The system of claim 1, wherein the operations further comprise receiving the authentication termination command.

9. A method comprising:
   initializing a memory device in an unauthenticated state in which the memory device is unable to execute one or more restricted commands;
   accessing a security capsule that is digitally signed using a private key, the security capsule specifying a manufacturer identifier;
   validating the security capsule, the validating of the security capsule comprising verifying the manufacturing identifier specified by the security capsule matches a manufacturer identifier of the memory device;
   verifying, using a public key corresponding to the private key, that the security capsule is validly signed;
   transitioning the memory device to an authenticated state based on validating the security capsule and verifying that the security capsule is validly signed, the memory device being able to execute the one or more restricted commands while in the authenticated state based on a set of command types the security capsule indicates that the memory device is able to execute while in the authenticated state; and
   in response to a power cycle event or an authentication termination command, reverting the memory device to the unauthenticated state in which the memory device is unable to execute the one or more restricted commands.

10. The method of claim 9, wherein the validating of the security capsule further comprises authenticating a security credential provided in conjunction with the security capsule.

11. The method of claim 9, wherein the security capsule comprises a data structure that includes at least one of: a counter value, and a list of commands.

12. The method of claim 11, wherein:
   the counter value is a first counter value;
   the memory device maintains a second counter value; and
   the validating of the security capsule further comprises determining the second counter value is less than or equal to the first counter value prior to transitioning to the authenticated state.

13. The method of claim 12, further comprising updating the second counter value based on the first counter value.

14. The method of claim 9, further comprising:

receiving an unrestricted command while the memory device is in the unauthenticated state; and executing the unrestricted command while the memory device is in the unauthenticated state.

15. The method of claim 9, wherein:

the security capsule specifies a list of command types; and the method further comprises:

receiving a command while the memory device is in the authenticated state; and determining whether the command is a prohibited command type based on the list of command types.

16. The method of claim 9, further comprising receiving the authentication termination command.

17. A non-transitory computer-readable storage medium comprising instructions that, when executed by a processing device, configure the processing device to perform operations comprising:

initializing a memory device in an unauthenticated state in which the memory device is unable to execute one or more restricted commands;

accessing a security capsule that is digitally signed using a private key, the security capsule specifying a manufacturer identifier;

validating the security capsule, the validating of the security capsule comprising:

verifying, using a public key corresponding to the private key, that the security capsule is validly signed;

verifying the manufacturing identifier specified by the security capsule matches a manufacturer identifier of the memory device;

transitioning the memory device to an authenticated state based on validating the security capsule, the memory device being able to execute the one or more restricted commands while in the authenticated state based on a set of command types the security capsule indicates that the memory device is able to execute while in the authenticated state; and in response to a power cycle event or receiving an authentication termination command, reverting the memory device to the unauthenticated state in which the memory device is unable to execute the one or more restricted commands.

18. The non-transitory computer-readable storage medium of claim 17, wherein the validating of the security capsule further comprises authenticating a security credential provided in conjunction with the security capsule.

19. The non-transitory computer-readable storage medium of claim 17, wherein the security capsule comprises a data structure that includes at least one of: a counter value, and a list of commands.

20. The non-transitory computer-readable storage medium of claim 19, wherein:

the counter value is a first counter value;

the memory device maintains a second counter value; and the validating of the security capsule further comprises determining the second counter value is less than or equal to the first counter value prior to transitioning to the authenticated state.

* * * * *